United States Patent
Rosenholm

(10) Patent No.: US 11,125,047 B1
(45) Date of Patent: Sep. 21, 2021

(54) DISSOLVABLE DIVERSION PACKAGE AND METHOD OF USE

(71) Applicant: Workover Solutions, Inc., Imperial, PA (US)

(72) Inventor: Carl Andrew Rosenholm, Sugar Land, TX (US)

(73) Assignee: Workover Solutions, Inc., Imperial, PA (US)

( * ) Notice: Subject to any disclaimer, the term of this patent is extended or adjusted under 35 U.S.C. 154(b) by 0 days.

(21) Appl. No.: 16/735,026

(22) Filed: Jan. 6, 2020

Related U.S. Application Data

(60) Provisional application No. 62/789,251, filed on Jan. 7, 2019.

(51) Int. Cl.
*C09K 8/516* (2006.01)
*E21B 33/13* (2006.01)

(52) U.S. Cl.
CPC .............. *E21B 33/13* (2013.01); *C09K 8/516* (2013.01)

(58) Field of Classification Search
None
See application file for complete search history.

(56) References Cited

U.S. PATENT DOCUMENTS

| | | |
|---|---|---|
| 3,437,147 A | 4/1969 | Davies |
| 9,212,535 B2 | 12/2015 | Tippel et al. |
| 9,567,824 B2 | 2/2017 | Watson et al. |
| 2009/0101334 A1* | 4/2009 | Baser ............... E21B 43/26 166/193 |
| 2012/0285695 A1 | 11/2012 | Lafferty et al. |
| 2016/0312157 A1 | 10/2016 | Haugaard |
| 2017/0107784 A1 | 4/2017 | Watson et al. |
| 2018/0187060 A1* | 7/2018 | Okura ............... C08K 3/01 |

* cited by examiner

*Primary Examiner* — Andrew Sue-Ako
(74) *Attorney, Agent, or Firm* — Jones Walker LLP

(57) ABSTRACT

Methods and systems for diverting the flow of fluids within a wellbore are disclosed. The methods and systems use a flow conveyed diverter pack, which includes a package portion and a wing portion. The package portion may contain a ball (a.k.a. a diverter ball) and may contain additional components. The diverter pack may be formed by sandwiching a diverter ball between films of a flexible material, for example, films of a dissolvable polymer. The diverter pack may be deployed in a wellbore, whereby the pack is conveyed by fluid flow to an opening to be sealed. The diverter pack seats upon the opening, thereby diverting flow from the opening.

20 Claims, 2 Drawing Sheets

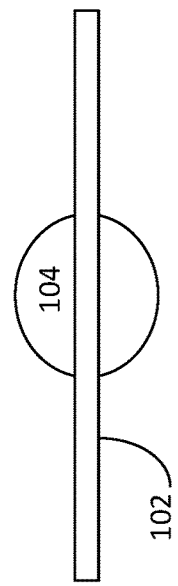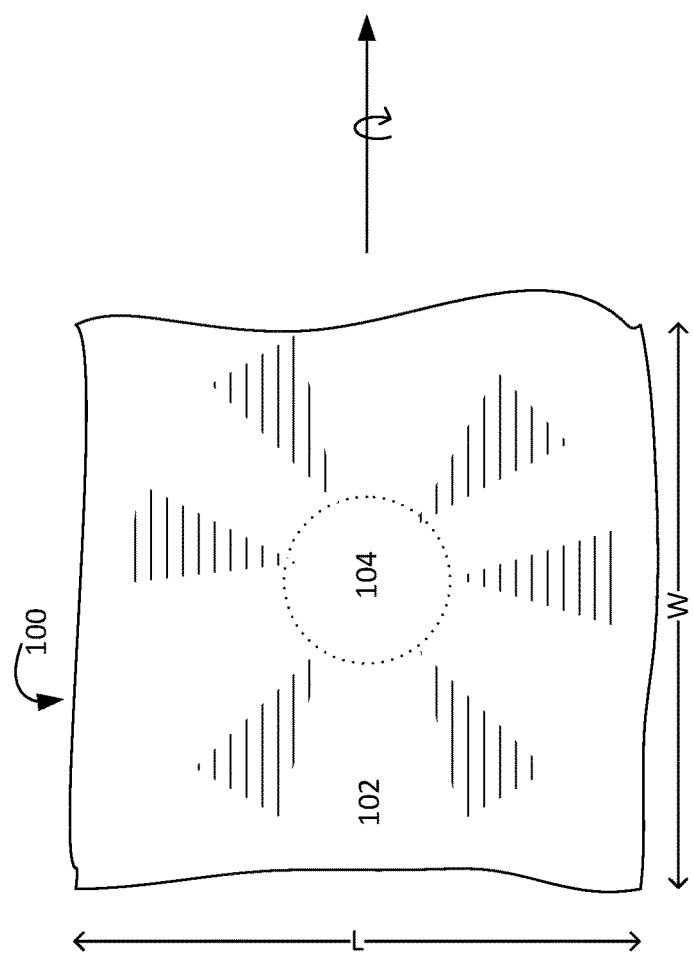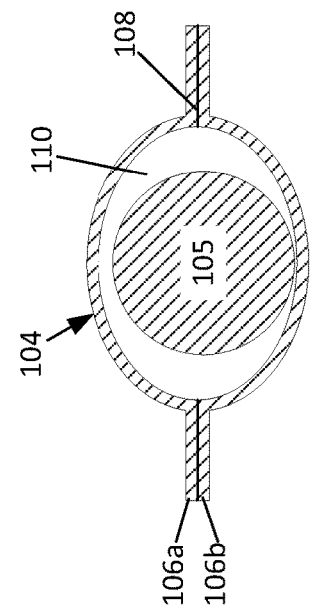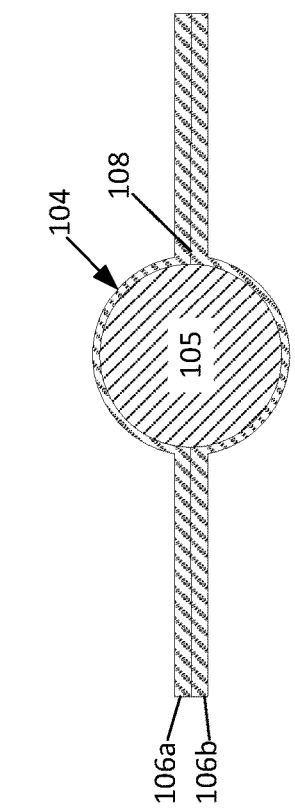

DISSOLVABLE DIVERSION PACKAGE AND METHOD OF USE

CROSS-REFERENCE TO RELATED APPLICATIONS

This is a non-provisional of U.S. Provisional Patent Application Ser. No. 62/789,251, filed Jan. 7, 2019, which is incorporated herein by reference in its entirety, and to which priority is claimed.

FIELD OF THE INVENTION

This application relates to methods and systems employed in hydrocarbon recovery operations and more particularly to plugging elements for controlling the flow of fluids in a wellbore.

BACKGROUND

Wellbores penetrating to subterranean formations are often provided with pipes having perforations to allow for the ingress and/or egress of fluids. For example, a wellbore may be equipped with a casing, which is normally set and cemented within a hydrocarbon-bearing formation. The casing may contain perforations for the recovery of fluids from the formation, as in the case of a production well, or the introduction of fluids into the formation, as in the case of an injection well or for use in hydraulic fracturing of the formation. The perforations may be formed in the casing using perforating techniques known in the art.

It is often desirable to control how and where fluid flows in a well vis-à-vis the perforations. For example, it may be desirable to prevent fluid form flowing into a particular formation zone or to cause fluid to flow into a different formation zone. Thus, it may be desirable to plug one or more of the casing perforations. It is known to use plugging elements, typically in the form of balls, to plug the perforations. Such plugging elements are known as "ball sealers" or "diverter balls," as they divert fluid flow from high flow perforations. The diverter balls are introduced into the wellbore, where they follow the flow of fluid through the well until they are seated by fluid pressure against the high-volume perforations in the casing, thereby diverting flow from those perforations. However, in some instances the diverter balls fail to seat in the casing perforations. Thus, there is the need for alternative reliable methods of controlling the flow of fluids in wells.

SUMMARY

Methods of plugging an opening within a subterranean well are disclosed. According to some embodiments, the method comprises deploying at least one diverter pack into the well. According to some embodiments the diverter pack comprises a package portion and a wing portion, wherein the package portion contains a ball. According to some embodiments, the method further comprises flowing a fluid through the well, thereby conveying the at least one diverter in the well such that the diverter pack sealingly engages the opening and prevents fluid from flowing through the opening. According to some embodiments, the diverter pack comprises a first film and a second film. According to some embodiments, the first film and second film are bonded together in the wing portion and not bonded together in the package portion. According to some embodiments, the first and second films comprises a first dissolvable material. According to some embodiments, the first dissolvable material is a first polyvinyl alcohol (PVA) compound. According to some embodiments, the ball comprises a second dissolvable material that is the same or different from the first dissolvable material. According to some embodiments, the second dissolvable material is a PVA compound that is the same or different than the first PVA compound. According to some embodiments, the package portion further contains at least one additional component in addition to the ball. According to some embodiments, the additional component is a gel. According to some embodiments, the gel comprises PVA. According to some embodiments, the additional component comprises one or more components selected from the group consisting of powder, flake, and pellets. According to some embodiments, the additional component comprises one or more materials selected from the group consisting of polylactic acid (PLA) and poly(glycolic acid) (PGA). According to some embodiments, the method further comprising dissolving the diverter pack. According to some embodiments, the at least one opening comprises at least one perforation in a wellbore casing. According to some embodiments, the at least one opening comprises an open sleeve valve, a leaking connection in a wellbore casing, or a corrosion hole.

Also disclosed herein is a plugging element for plugging an opening in a subterranean well. According to some embodiments, the plugging element comprises a diverter pack comprising a wing portion and a package portion containing a ball. According to some embodiments, the diverter pack comprises a first film and a second film, wherein the ball is disposed between the first film and the second film and the first and second films are bonded together to form the wing portion leaving a cavity containing the ball, wherein the cavity defines the package portion. According to some embodiments, the first and second films comprises a first dissolvable material. According to some embodiments, the first dissolvable material is a first polyvinyl alcohol (PVA) compound. According to some embodiments, the ball comprises a second dissolvable material that is the same or different from the first dissolvable material. According to some embodiments, the second dissolvable material is a PVA compound that is the same or different than the first PVA compound. According to some embodiments, the package portion further contains an additional component in addition to the ball. According to some embodiments, the additional component is a gel. According to some embodiments, the gel comprises PVA. According to some embodiments, the additional component comprises one or more components selected from the group consisting of powder, flake, and pellets. According to some embodiments, the additional component comprises one or more materials selected from the group consisting of polylactic acid (PLA) and poly(glycolic acid) (PGA).

BRIEF DESCRIPTION OF THE DRAWINGS

FIGS. 1 A-1 D show aspects of a divert pack.

DESCRIPTION

Figure 2:
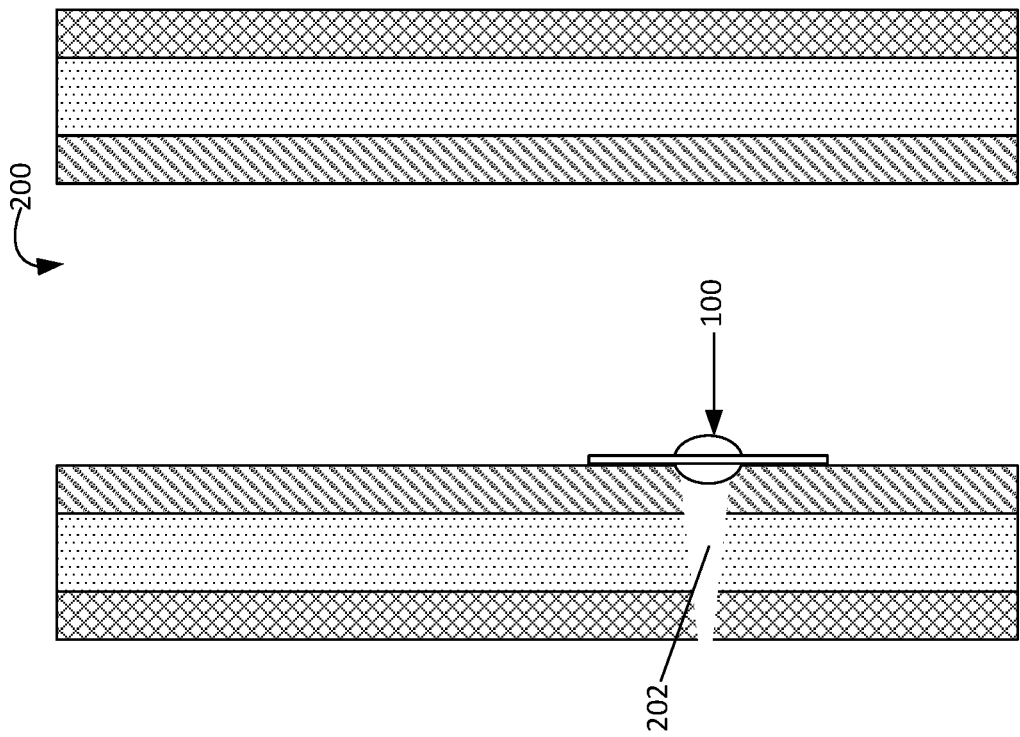
FIGS. 2 A-2 B show use of a diverter pack.
Figure 2:
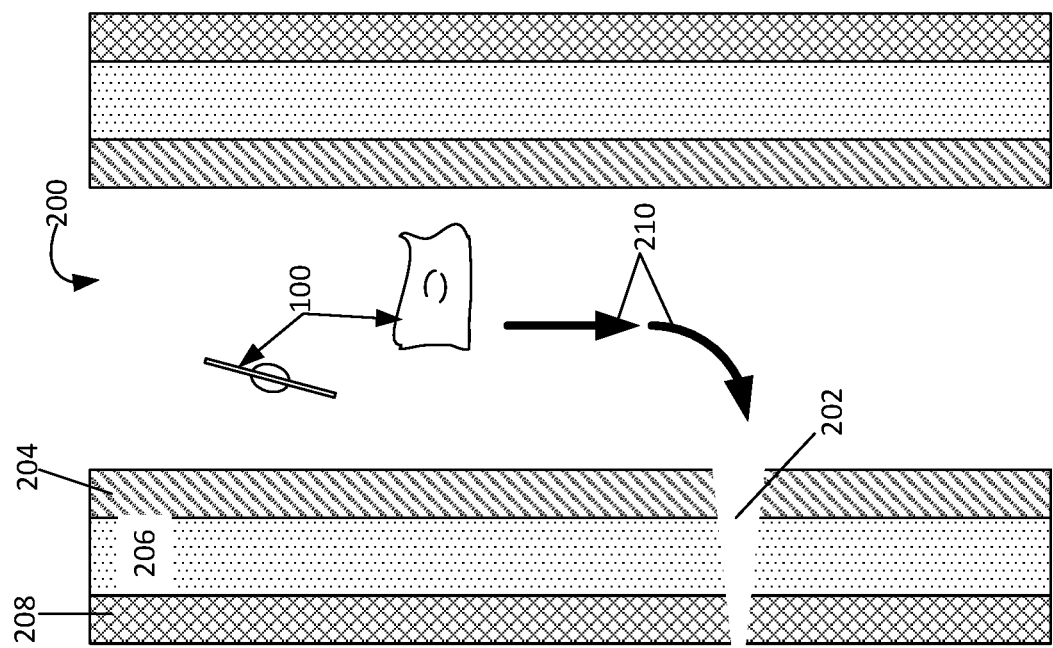

Aspects of the disclosure provide plugging elements for controlling the flow of fluids in a wellbore. FIGS. 1 A, 1 B and 1 C illustrate an embodiment of a flow conveyed diverter pack 100 in plan view, edge view, and cross section, respectively, according to aspects of the disclosure. The illustrated diverter pack 100 comprises a wing portion 102 and a package portion 104. The package portion 104 contains a ball 105 (a.k.a., a diverter ball, shown in cross section FIGS. 1 C and 1 D). Note that, according to some embodiments, the ball 105 need not be spherical, as illustrated in the drawings. The ball 105 may be spherical, oblong, egg-shaped, or essentially any shape. According to some embodiments, the diverter pack 100 can be formed from a first film 106a and a second film 106b. The first and second films can be formed from a flexible material. The ball 105 is sealed between the first and second films. According to some embodiments, the diverter pack 100 is formed by sandwiching the ball 105 between the films 106a and 106b and bonding the interface 108 of the films together to form the package portion 104, i.e., to form a cavity containing the ball. In the embodiment illustrated in FIG. 1 C, the films are bonded such that little or substantially no space exists between the ball 105 and the sealed films, and thus, the ball 105 substantially fills the package portion 104. In an alternative embodiment illustrated in FIG. 1 D, the package portion cavity is larger than the ball 105. As explained in more detail below, the package portion 104 can contain additional materials.

According to some embodiments, the films 106a/b and/or the ball 105 comprise a dissolvable polymeric material. According to some embodiments, the dissolvable polymeric material comprises polyvinyl alcohol (PVA). PVA is a water-soluble polymer having an ideal formula of $[CH_2CH(OH)]_n$. PVA's repeat unit includes a hydroxyl functional group having a random stereochemistry along the polymer chain (i.e., PVA is atactic). PVA is generally produced by a two-step process: 1) the polymerization of vinyl acetate to form polyvinyl acetate and 2) the hydrolysis of the acetate groups in the polyvinyl acetate to form PVA. The properties of PVA are highly dependent on its molecular weight and the degree of hydrolysis (i.e., the percentage of acetate groups that are hydrolyzed). The molecular weight of PVA is controlled by controlling the vinyl acetate polymerization reaction and the degree of hydrolysis is controlled by controlling the extent of the hydrolysis reaction. As molecular weight and/or the degree of hydrolysis increases, PVA exhibits increased viscosity, increased tensile strength, and increased water and solvent resistance. As molecular weight and/or the degree of hydrolysis decreases, PVA exhibits decreased viscosity, increased flexibility, and increased solubility. PVA can be categorized based upon its degree of hydrolysis as fully hydrolyzed (e.g., >97 mol %), medium hydrolyzed (e.g., 95 to 97 mol %), and partially hydrolyzed (e.g., 85 to 95 mol %).

The inventor has specifically observed beneficial properties of the following raw PVA compounds for uses in different applications in downhole operations, including use as components of a diverter pack 100: Kuraray Mowiflex C 17 (formerly Mowiflex TC 253), Kuraray Mowiflex C 30 (formerly Mowiflex TC 232), and Kuraray Mowiflex H 15 (each available from Kuraray America, Inc. Houston, Tex.). The Mowiflex C 17 PVA compound contains greater than 96 wt % PVA and has a glass transition temperature of 62° C., a density of 0.6 to 0.9 g/cm$^3$, and a melt flow index of 14-20 g/10 min at 190° C. and a load of 21.6 kg. The Mowiflex C 30 PVA compound contains approximately 75 wt % PVA, 20 wt % aliphatic polyols (plasticizer), and 5 wt % calcium stearate (lubricant) and has a glass transition temperature of 35° C., a density of 0.6 to 0.9 g/cm$^3$, and a melt flow index of 20-40 g/10 min at 190° C. and a load of 21.6 kg. The Mowiflex H 15 PVA compound has a melt flow index of approximately 15 g/10 min at 230° C. and a load of 2.16 kg. The melt flow index values of these raw PVA compounds may be determined in accordance with the ASTM D1238 and/or ISO 1133 test procedures. While these specific grades of PVA compounds are described for purposes of illustration, it will be understood that other types and grades of raw PVA compounds are also suitable. As used herein, the term raw PVA compound refers to an initial material that contains an appreciable quantity of PVA (such as those described above), which is typically supplied by a PVA manufacturer in powder or pelletized form and which can be shaped into a final product or further processed before final shaping. It will be appreciated from the above examples that raw PVA compounds may include materials other than PVA and may include PVA of varying molecular weights and degrees of hydrolysis. Raw PVA compounds can be processed by blending with other polymers and/or adding colorants, fillers, reinforcing materials, or other additional materials to obtain a processed PVA compound having the desired properties. Thus, as used herein, the term processed PVA compound refers to a PVA compound that has been processed to include these various additional materials and may exist as a pellet, a melt, a powder, or a final shaped component. The term PVA compound may refer to either a raw PVA compound or a processed PVA compound.

It has been determined that PVA compounds in which the PVA component has a lower molecular weight and/or a lower degree of hydrolysis (e.g., partially hydrolyzed) or that include a plasticizer (e.g., a polyol plasticizer), such as the Mowiflex C 30 compound, are particularly well-suited for use in manufacturing flexible components, such as the flexible films 106a/b, although other PVA compounds are also suitable.

A first type of modification seeks to decrease the hardness of the component. It has been observed that a flexible film that is formed from the Mowiflex C 30 PVA compound alone exhibits a hardness of approximately 97 Shore A, and its hardness decreases only slightly at increased temperatures (e.g., to approximately 94 Shore A at 200° F.).

The hardness of the flexible films may be decreased through the addition of a styrene-rubber polymer additive, which is a copolymer that includes polystyrene and rubber. In one embodiment, the styrene-rubber polymer additive may be a block copolymer such as a styrene-ethylene/butylene-styrene (SEBS) or a styrene-ethylene/propylene-styrene (SEPS) polymer such as those manufactured by Kraton. In one embodiment, Kraton's FG1924 GT polymer, which is a linear triblock copolymer based on styrene and ethylene/butylene with a styrene/rubber ratio of 13/87, is mixed with the Mowiflex C 30 PVA compound in an amount in which the resulting processed PVA compound includes 50 wt % of the styrene-rubber polymer. The resulting processed PVA compound exhibits a hardness at room temperature of approximately 92 Shore A, and the hardness decreases significantly at elevated temperatures (e.g., to approximately 75 Shore A at 200° F.). The addition of the styrene-rubber polymer additive decreases the glass transition temperature (as compared to the material manufactured from the Mowiflex C 30 PVA compound alone) and does not retard the degradation of the material. While the Kraton FG1924 GT polymer has been described, it will be understood that other styrene-rubber polymers might also be employed. In addition, different types of degradation/impact modifiers may be utilized to decrease the hardness and glass transition temperature of a PVA compound. By way of example, materials such as Dupont's Surlyn 9320 or Fusabond N493 may be utilized in similar concentrations to the above-described styrene-rubber polymer to achieve similar results. Dupont's Surlyn 9320 is an ionomer of ethylene acid acrylate terpolymer.

The hardness and density of the flexible films may also be decreased through the addition of a chemical foaming agent. In one embodiment, Bergen International's Foamazol 92 chemical foaming agent is added to the processed PVA compound formed from equal parts of the Kraton FG1924 GT styrene-rubber polymer and the Mowiflex C 30 compound in an amount equal to 2 wt % of the processed PVA compound. Upon exposure to increased temperatures (such as those encountered in injection molding or extrusion processes described below), a chemical foaming agent generates a gas. The addition of the chemical foaming agent significantly reduces the hardness and density of the resulting processed PVA compound. While the Bergen Foamazol 92 chemical foaming agent has been described, it will be understood that other chemical foaming agents (including endothermic, exothermic, organic, and inorganic chemical foaming agents) may be employed. As used herein, a chemical foaming agent is a material that facilitates the formation of foam by liberating gas (such as nitrogen, carbon dioxide, etc.) upon exposure to elevated temperatures.

The hardness of the flexible films may also be decreased through the addition of further plasticizer (i.e., in addition to any plasticizer that is present in the raw PVA compound). In one embodiment, the Mowiflex C 30 PVA compound is mixed with Poly[4,4'-methylenebis(phenyl isocayanate)-alt-1,4-butanediol/di(propylene glycol)/polycaprolactone] plasticizer in an amount in which the resulting processed PVA compound includes 14 wt % of the plasticizer. The resulting processed PVA compound exhibits a hardness at room temperature of approximately 94 Shore A, and the hardness decreases at elevated temperatures (e.g., to approximately 86 Shore A at 200° F.). Although these particular plasticizer materials have been described, it will be understood that other plasticizer materials might also be employed.

The premature degradation of components of the disclosed diverter packs may be addressed/controlled through the addition of polycaprolactam (PA6 or Nylon-6), which results in the decrease of degradation rates by as much as 80% (as compared to the raw PVA compound) without significantly changing the mechanical properties. In one embodiment, the Mowiflex C 30 PVA compound is mixed with PA6 in an amount in which the resulting processed PVA compound includes 10 wt % PA6. The resulting processed PVA compound exhibits significantly reduced degradation rates. In another embodiment, a processed PVA compound consisting of equal weights of the Mowiflex C 30 PVA compound and the Kraton FG1924 GT polymer is mixed with PA6 in an amount in which the resulting processed PVA compound includes 10 wt % PA6. The resulting processed PVA compound exhibits a significantly reduced degradation rate and a hardness at room temperature of approximately 94 Shore A, which hardness decreases significantly at elevated temperatures (e.g., to approximately 79 Shore A at 200° F.). In one embodiment, the polycaprolactam may be an elastomeric type of polycaprolactam. As used herein, an elastomeric polycaprolactam exhibits greater than 100% strain at break and has a hardness of less than 70 Shore D.

The addition of compounds such as a styrene-rubber polymer (or other degradation/impact modifier), a chemical foaming agent, a plasticizer, a swelling compound, and/or PA6 in desired quantities results in a processed PVA compound with flexibility, hardness, and degradability properties that are well-suited for use as the flexible films and/or ball of the disclosed diverter packs. One or more of the described additives may be mixed with a PVA compound (in any combination of one or more listed additives with a PVA compound) in different ratios. For example, the flexible films and/or ball may be formed from a processed PVA compound that includes between 5 wt % and 70 wt % styrene-rubber polymer, between 20 wt % and 60 wt % styrene-rubber polymer, between 30 wt % and 60 wt % styrene-rubber polymer, between 40 wt % and 60 wt % styrene-rubber polymer, or between 45 wt % and 55 wt % styrene-rubber polymer. A component with a styrene-rubber polymer additive may have a hardness at 70° F. of between 88 and 96 Shore A, between 90 and 94 Shore A, or between 91 and 92 Shore A. A component with a styrene-rubber polymer additive may have a hardness at 200° F. of between 70 and 80 Shore A, between 72 and 78 Shore A, or between 74 and 76 Shore A.

The ball and/or flexible films may also be formed from a processed PVA compound that includes between 5 wt % and 25 wt % PA6, between 5 wt % and 15 wt % PA6, or between 8 wt % and 12 wt % PA6. The ball and/or flexible films may also be formed from a processed PVA compound that includes between 5 wt % and 20 wt % plasticizer (in addition to any plasticizer in the raw PVA compound), between 10 wt % and 15 wt % plasticizer (in addition to any plasticizer in the raw PVA compound), or between 13 wt % and 15 wt % plasticizer (in addition to any plasticizer in the raw PVA compound). The ball and/or flexible films may also be formed from a processed PVA compound that includes between 1 wt % and 25 wt % swelling compound, between 5 wt % and 20 wt % swelling compound, or between 10 wt % and 15 wt % swelling compound. The ball and/or flexible films may also be formed from a processed PVA compound that includes between 0.5 wt % and 5 wt % chemical foaming agent, between 1 wt % and 3 wt % chemical foaming agent, or between 1.5 wt % and 2.5 wt % chemical foaming agent. Each of the additives (e.g., a styrene-rubber polymer, a chemical foaming agent, a plasticizer, a swelling compound, and/or PA6) may be obtained in a pelletized form (although other forms may also be used), and the additives may be mixed with the PVA compound during or prior to forming the ball and/or flexible films.

Referring again to FIGS. 1 A-1 D, the flexible films 106a/b may comprise films of a dissolvable polymeric material, such as any of the materials described above. The films may be generally any thickness, depending on the situation, but typically are about 0.001" to about 0.125" thick. Processes for making water-soluble articles, including films and/or balls, include casting, blow-molding, extrusion and blown extrusion, as known in the art. One contemplated class of embodiments is characterized by the water-soluble film described herein being formed by casting, for example, by admixing the ingredients described herein with water to create an aqueous mixture, for example a solution with optionally dispersed solids, applying the mixture to a surface, and drying off water to create a film. Similarly, other compositions can be formed by drying the mixture while it is confined in a desired shape.

Any suitable method of bonding the films to seal the ball between the flexible films may be utilized. Non-limiting examples of such methods include heat sealing, solvent welding, solvent or wet sealing, and combinations thereof. For example, the films can be heat sealed together at a temperature of at least 200° F. (93° C.), for example in a range of about 220° F. (about 105° C.) to about 290° F. (about 145° C.), or about 230° F. (about 110° C.) to about 280° F. (about 140° C.). The heat or solvent can be applied by any method. If solvent or wet sealing or welding is used, it may be preferred that heat is also applied. Preferred wet or solvent sealing/welding methods include selectively applying solvent onto the area, by for example, spraying or printing this onto these areas, and then applying pressure onto these areas, to form the seal.

The ball 105 may generally be any size, depending on the situation, but typically are on the order of 3/8" to 1 inch in diameter. Examples include 3/8", 5/8", and 7/8". The area of the diverter pack 100 (L×W in FIG. 1 A) may generally be any size depending on the situation. Typically, the area is on the order of about 4 square inches to about 16 square inches.

Referring again to FIG. 1 D, the space or pouch 110, created between the flexible films 106 can contain components in addition to the ball 105. For example, the space or pouch 110 can contain a gel material and/or a grease analog. According to some embodiments, the gel material and/or grease analog(s) can be water soluble. Example gel materials include PVA gels, such as mold release gels. Examples of grease analogs can include carboxymethyl cellulose, for example. Other examples of grease analogs can include silicone-based oils, tall oil derivatives, such as sodium and potassium salts of tall oil, and the like. The inclusion of a gel material and/or grease analog within the space or pouch 110 can facilitate the seating of the diverter pack 100 within a perforation and sealing of the perforation. Additionally, or alternatively, the space or pouch 110 can contain materials such as powder, flake or pellets. Examples of powder, flake, or pellet materials include PVA, polylactic acid (PLA), poly(glycolic acid) (PGA), and the like. Other materials include sand, salt, shredded water-soluble film (such as PVA-based films described above), and water-soluble monofilament.

FIGS. 2 A and 2 B show an example of a use of the diverter pack 100 to seal an opening 202 in a well 200. In the illustrated embodiment, the opening 202 is a perforation that penetrates a casing 204, a cement layer 206, and into a formation 208. The diverter pack 100 is deployed into the well 200 and is conveyed through the well by fluid flow 210. The diverter pack 100 may be deployed into the well using any method typically used to deploy conventional diverter balls/ball sealers. But in contrast to conventional diverter balls, the geometry of the diverter pack 100 (particularly, the wing portion 102) enhances fluid drag on the diverter pack, facilitating its susceptibility to be carried by the fluid flow 210. Since the flow 210, or a portion thereof, exits the well via the opening 202, the diverter pack 100 will be carried by the fluid drag to the opening 202, where it will seat upon or within the opening, as illustrated in FIG. 2 B. It will be appreciated that in the idealized illustration, the package portion 104 is appropriately sized such that it does not pass through the opening 202 but is instead lodged into the opening. However, in some practical embodiments, the package portion 104 may be received only partially in the opening 202 or may be entirely received into the opening. The package portion 104 may completely block the flow through the opening 202 or a combination of the package portion 104 and the wing portion 102 may block the flow.

As described above, some embodiments of the diverter pack 100 comprise dissolvable or degradable components. If the diverter pack 100 is degradable, it may be self-degrading or it may be degraded in response to a stimulus. For example, the diverter pack 100 may dissolve in water at elevated temperatures. For example, in a test environment, a 7/8" diameter ball 105 made of PVA was observed to completely dissolve in 175° F. water in about eight hours. Another 7/8" diameter PVA ball 105 was reduced to 5/8" diameter in 24 hours in 70° F. water. The diverter pack 100 may begin to degrade in water at ambient conditions (i.e., 70° F.). According to some embodiments, relatively low temperature fracturing fluid has little or no effect on the diverter pack 100. However, when the diverter pack 100 is exposed to fluids at increased temperatures they degrade quickly. These properties make the diverter pack 100 ideally suited for use in downhole applications such as hydraulic fracturing because the temperature of the fresh fracture fluid acts to inhibit degradation of the diverter pack 100 during the fracturing operation and to enable degradation after the operation is complete and fluid temperatures increase. The degradation rate of the diverter pack components can be modified through the addition of material such as polyethylene or PA6.

It should be appreciated that while the use of the disclosed flow-conveyed plugging elements, such as the diverter pack 100, have been described herein primarily in the context of sealing casing perforations, such as during fracturing operations, the plugging elements can be used in other contexts. For example, the plugging elements, such as the diverter pack 100, can be used to block open sleeve valves, any sort of perforation or leak path in a well (such as leaking connections in the casing, corrosion holes, etc.).

The foregoing disclosure and the showings made of the drawings are merely illustrative of the principles of this invention and are not to be interpreted in a limiting sense.

What is claimed is:

1. A method of making a diverter pack for plugging an opening in a subterranean well, the method comprising:
    sandwiching a diverter ball element between a first film and a second film, and
    bonding the first and second films together to form a cavity portion containing the diverter ball element and a wing portion comprising the boded first and second films.

2. The method of claim 1, wherein the first and second films comprises a first dissolvable material.

3. The method of claim 1, wherein the ball element comprises a second dissolvable material that is the same or different from the first dissolvable material.

4. A diverter pack for plugging an opening in a subterranean well, the diverter pack comprising:
    a first film, a second film, and a diverter ball element,
    wherein the diverter ball element is disposed between the first and second films,
    wherein the first and second films are bonded together to form a cavity portion containing the diverter ball element and a wing portion comprising the bonded first and second films, and
    wherein the diverter pack is made by sandwiching the diverter ball element between the first and second films, and bonding the first and second films together to form the cavity portion and the wing portion.

5. The diverter pack of claim 4, wherein the first and second films comprises a first dissolvable material.

6. The diverter pack of claim 5, wherein the first dissolvable material comprises a first polyvinyl alcohol (PVA) compound.

7. The diverter pack of claim 6, wherein the first PVA compound comprises PVA and one or more of a styrene-rubber polymer additive, a chemical foaming agent, a plasticizer, or a polycaprolactam.

8. The diverter pack of claim 4, wherein the ball element comprises a second dissolvable material that is the same or different from the first dissolvable material.

9. The diverter pack of claim 8, wherein the second dissolvable material is a PVA compound.

10. A diverter pack for plugging an opening in a subterranean well, the diverter pack comprising:
    a first film, a second film, and a diverter ball element,
    wherein the diverter ball element is disposed between the first and second films,
    wherein the first and second films are bonded together to form a cavity portion containing the diverter ball element and a wing portion comprising the bonded first and second films, and
    wherein the cavity portion further contains at least one component in addition to the diverter ball element, wherein the at least one component is selected from the group consisting of a gel, powder, flakes, pellets, and combinations thereof.

11. The diverter pack of claim 10, wherein the first film and second film are bonded together in the wing portion and not bonded together in the cavity portion.

12. The diverter pack of claim 10, wherein the first and second films comprises a first dissolvable material.

13. The diverter pack of claim 12, wherein the first dissolvable material comprises a first polyvinyl alcohol (PVA) compound.

14. The diverter pack of claim 13, wherein the first PVA compound comprises PVA and one or more of a styrene-rubber polymer additive, a chemical foaming agent, a plasticizer, or a polycaprolactam.

15. The diverter pack of claim 12, wherein the ball element comprises a second dissolvable material that is the same or different from the first dissolvable material.

16. The diverter pack of claim 15, wherein the second dissolvable material is a PVA compound.

17. The diverter pack of claim 10, wherein the diverter ball element is spherical.

18. The diverter pack of claim 10, wherein the diverter ball element is ovoid (egg-shaped).

19. The diverter pack of claim 10, wherein the gel comprises PVA.

20. The diverter pack of claim 10, wherein the at least one component in addition to the diverter ball element comprises one or more of polylactic acid or poly(glycolic acid).

* * * * *